(12) United States Patent
Bakker et al.

(10) Patent No.: US 8,574,340 B2
(45) Date of Patent: Nov. 5, 2013

(54) METHODS FOR PREPARING AND USING METAL AND/OR METAL OXIDE POROUS MATERIALS

(75) Inventors: Martin Bakker, Tuscaloosa, AL (US); Franchessa Maddox Sayler, Tuscaloosa, AL (US); Amy Grano, Tuscaloosa, AL (US); Jan-Henrik Smått, Turku (FI)

(73) Assignee: Board of Trustees of The University of Alabama, Tuscaloosa, AL (US)

( * ) Notice: Subject to any disclaimer, the term of this patent is extended or adjusted under 35 U.S.C. 154(b) by 0 days.

(21) Appl. No.: 13/405,714

(22) Filed: Feb. 27, 2012

(65) Prior Publication Data

US 2012/0219735 A1 Aug. 30, 2012

Related U.S. Application Data

(60) Provisional application No. 61/447,072, filed on Feb. 27, 2011.

(51) Int. Cl.
*C22B 5/00* (2006.01)
*C01G 1/02* (2006.01)
*C01B 13/18* (2006.01)

(52) U.S. Cl.
USPC .......................................... 75/415; 423/592.1

(58) Field of Classification Search
USPC .......................................... 75/415; 423/592.1
See application file for complete search history.

(56) References Cited

U.S. PATENT DOCUMENTS

| | | | |
|---|---|---|---|
| 3,404,030 A | 10/1968 | Palmateer | |
| 6,398,962 B1 | 6/2002 | Cabrera et al. | |
| 6,911,192 B2 | 6/2005 | Nakanishi | |
| 7,374,599 B1 | 5/2008 | Shelnutt et al. | |
| 2003/0187294 A1* | 10/2003 | Hagemeyer et al. | 560/241 |
| 2005/0079374 A1* | 4/2005 | Asai | 428/613 |
| 2011/0251053 A1 | 10/2011 | Tucker et al. | |

OTHER PUBLICATIONS

Banhart et al., Metal Foams: Production and Stability, Adv. Eng. Mat., 8:781-794 (2006).
Bates et al., Block Copolymers—Designer Soft Materials, Physics Today, 52(2):32-38 (1999).
Blanford et al., Gems of Chemistry and Physics: Macroporous Metal Oxides with 3D Order, Adv. Mat., 13:401-407 (2001).
Brockner et al., Thermal decomposition of nickel nitrate hexahydrate, Ni(NO3)2 •6H2O, in comparison to Co(NO3)2 •6H2O and Ca(NO3)2•4H2O, Thermochim. Acta, 456:64-68 (2007).
Carn et al., Inorganic monoliths hierarchically textured via concentrated direct emulsion and micellar templates, J. Mater. Chem., 14:1370-1376 (2004).

(Continued)

*Primary Examiner* — George Wyszomierski
*Assistant Examiner* — Tima M McGuthry Banks
(74) *Attorney, Agent, or Firm* — Meunier Carlin & Curfman, LLC

(57) ABSTRACT

Methods involve producing carbon, metal and/or metal oxide porous materials that have precisely controlled structures on the nanometer and micrometer scales. The methods involve the single or repeated infiltration of porous templates with metal salts at controlled temperatures, the controlled drying and decomposition of the metal salts under reducing conditions, and optionally the removal of the template. The carbon porous materials can be prepared by methods that involve the infiltration of a carbon precursor into a porous template, followed by polymerization and pyrolysis. These porous materials have utility in separations and catalysis, among others.

15 Claims, 8 Drawing Sheets

(56) References Cited

OTHER PUBLICATIONS

Caruso et al., Silica Films with Bimodal Pore Structure Prepared by Using Membranes as Templates and Amphiphiles as Porogens, Adv. Functional Mat., 12(4):307-312 (2002).

Caruso et al., Cellulose Acetate Templates for Porous Inorganic Network Fabrication, Adv. Mat., 12(24):1921-1923 (2000).

Davis et al., Bacterial templating of ordered macrostructures in silica and silica-surfactant mesophases, Nature, 385:420-423 (1997).

Estelle et al., Comparative study of the morphology and surface properties of nickel oxide prepared from different precursors, Solid State Ionics, 156:233-243 (2003).

Fuller et al., Degradation of explosives-related compounds using nickel catalysts, Chemosphere, 67:419-427 (2007).

Hu et al., Synthesis of Hierarchically Porous Carbon Monoliths with Highly Ordered Microstructure and Their Application in Rechargeable Lithium Batteries with High-Rate Capability, Adv. Functional Mater., 17(12):1873-1878 (2007).

Lepoutre et al., Detailed study of the pore-filling processes during nanocasting of mesoporous films using $SnO_2/SiO_2$ as a model system, Micro. Meso. Mater., 123:185-192 (2009).

Li et al., Controlling the Shape and Alignment of Mesopores by Confinement in Colloidal Crystals: Designer Pathways to Silica Monoliths with Hierarchical Porosity, Langmuir, 23(7):3996-4004 (2007).

Llewellyn et al., Preparation of reactive nickel oxide by the controlled thermolysis of hexahydrated nickel nitrate, Solid State Ionics, 101-103(2):1293-1298 (1997).

Lu et al. chapters 2 and 3, Nanocasting: A Versatile Strategy for Creating Nanostructured Porous Materials; Royal Society of Chemistry: Cambridge (2010).

Lu et al., Combined Surface and Volume Templating of Highly Porous Nanocast Carbon Monoliths, Adv. Functional Mater., 15:865-871 (2005).

Lu et al., Easy and flexible preparation of nanocasted carbon monoliths exhibiting a multimodal hierarchical porosity, Micro. Meso. Mater., 72:59-65 (2004).

Lu et al., Synthesis of Polyacrylonitrile-Based Ordered Mesoporous Carbon with Tunable Pore Structures, Chem. Mater., 16(1):100-103 (2004).

Maddox et al., Development of Ultrahigh Surface Area Porous Electrodes using Simultaneous and Sequential Meso- and Micro-structuring Methods, In Mobile Energy, Materials Research Society: Boston, vol. 1127E (2009).

Maddox et al., Development of Ultrahigh Surface Area Porous Electrodes using Simultaneous and Sequential Meso- and Micro-structuring Methods; MRS Proceedings, 1127:T04-T08 (2008).

Maekawa et al., Meso/Macroporous Inorganic Oxide Monoliths from Polymer Foams, Adv. Mat., 15(7-8):591-596 (2003).

Mansour, Spectroscopic and microscopic investigations of the thermal decomposition of nickel oxysalts. Part 2. Nickel nitrate hexahydrate, Thermochim. Acta, 228(15):173-189 (1993).

Nakanishi, Pore Structure Control of Silica Gels Based on Phase Separation, J. Porous. Mat., 4(2):67-112 (1997).

Nelmark et al., Theory of Preparation of Supported Catalysts, Ind. Eng. Chem. Prod. Res. Dev., 20:439-450 (1981).

Nishihara et al., Ordered Macroporous Silica by Ice Templating, Chem. Mater., 17(3):683-689 (2005).

Paulik et al., Investigation of the Phase Diagram for the System $Ni(NO3)2-H2O$ and Examination of the Decomposition of $Ni(NO3)2$ $6H2O$ Thermochim. Acta, 121:137-149 (1987).

Ryoo et al., Ordered Mesoporous Carbons, Adv. Mat., 13(9):677-681 (2001).

Sholklapper et al., Synthesis of Dispersed and Contiguous Nanoparticles in Solid Oxide Fuel Cell Electrodes, Fuel Cells, 5:303-312 (2008).

Sietsma et al., Ordered Mesoporous Silica to Study the Preparation of $Ni/SiO2$ ex Nitrate Catalysts: Impregnation, Drying, and Thermal Treatments, Chem. Mater., 20(9):2921-2931 (2008).

Sietsma et al., How nitric oxide affects the decomposition of supported nickel nitrate to arrive at highly dispersed catalysts, J. Catal., 260:227-235 (2008).

Smått et al., Synthesis of micrometer sized mesoporous metal oxide spheres by nanocasting, Micro. Meso. Mater., 112:308-318 (2008).

Smått et al., Hierarchically Porous Metal Oxide Monoliths Prepared by the Nanocasting Route, Chem. Mater., 18:1443-1450 (2006).

Smått et al., Hierachically porous nanocrystalline cobalt oxide monoliths through nanocasting, Chem. Comm., 19:2188-2189 (2004).

Smått et al., Versatile Double-Templating Synthesis Route to Silica Monoliths Possessing a Multimodal Hierarchical Porosity, Chem. Mater., 15:2354-2361 (2003).

Stein et al., Morphological Control in Colloidal Crystal Templating of Inverse Opals, Hierarchical Structures, and Shaped Particles, Chem. Mater., 20(3):649-666 (2008).

Stein, Sphere templating methods for periodic porous solids, Micro. Meso. Mater., 44-45:227-239 (2001).

Sturm et al, Tin Dioxide Microspheres as a Promising Material for Phosphopeptide Enrichment Prior to Liquid Chromatography-(Tandem) Mass Spectrometry Analysis, Adv. Functional Mater., 18(16):2381-2389 (2008).

Sun et al., Container Effect in Nanocasting Synthesis of Mesoporous Metal Oxides, J. Am. Chem. Soc., 133 (37):14542-14545 (2011).

Suzuki et al., Synthesis of mesoporous silica foams with hierarchical trimodal pore structures, J. Mater. Chem., 13:1812-1816 (2003).

Tappan et al., Nanoporous Metal Foams, Angew. Chem. Int. Ed., 49:4544-4565 (2010).

Tappan et al., Ultralow-Density Nanostructured Metal Foams: Combustion Synthesis, Morphology, and Composition, J. Am. Chem. Soc., 128(20):6589-6594 (2006).

Vargas-Florencia et al., Inorganic Salt Hydrates as Cryoporometric Probe Materials to Obtain Pore Size Distribution, J. Phys Chem. B, 110:3867-3870 (2006).

Walsh et al., Dextran templating for the synthesis of metallic and metal oxide sponges, Nat. Mat., 2:386-390 (2003).

Yan et al., A Chemical Synthesis of Periodic Macroporous NiO and Metallic Ni, Adv. Mat., 11(12):1003-1006 (1999).

Yang et al., Synthesis of replica mesostructures by the nanocasting strategy, J. Mater. Chem., 15:1217-1231 (2005).

Yue et al., Synthesis of Porous Single Crystals of Metal Oxides via a Solid-Liquid Route, Chem. Mater. 19(9): 2359-2363 (2007).

Yue et al., Mesoporous metal oxides templated by FDU-12 using a new convenient method, Studies Surf. Sci. Catal., 170:1755-1762 (2007).

Zhao et al., Multiphase Assembly of Mesoporous-Macroporous Membranes, Chem. Mater., 11(5):1174-1178 (1999).

\* cited by examiner

METHODS FOR PREPARING AND USING METAL AND/OR METAL OXIDE POROUS MATERIALS

CROSS REFERENCE TO RELATED APPLICATIONS

This application claims the benefit of priority to U.S. Provisional Application No. 61/447,072, filed Feb. 27, 2011, which is incorporated by reference herein in its entirety.

FIELD

The subject matter disclosed herein relates to methods for producing metal and/or metal oxide porous materials. Metal and/or metal oxide porous materials and methods of using them are also disclosed herein.

BACKGROUND

A number of methods have been advanced to produce controlled porosity on micrometer and millimeter length scales. Principal among these methods is the use of colloidal templating in which micrometer sized beads of silica or polymers such as polystyrene are used as template for sol-gel mixtures, primarily silica. The sol-gel mixture may or may not include a structure directing agent to give porosity on the nanometer scale. After the removal of the polymer and nanostructure directing agent by dissolution or combustion, a three dimensional replica is produced. These replicas have regular, highly ordered micropore networks, are typically not mechanically very strong, and are difficult to produce in large bodies. The need for polymer or silica beads increases the cost of this synthesis and limits the range of structures available. The need for infiltration of the sol-gel precursor through the material also limits the applicability of this approach. The material formed by this approach has been used as a template for the formation of metal oxide and metals. Such materials have low surface areas.

Other methods for producing porous metal materials known as metal foams include bubbling gas through molten metal, generating gas during an exothermic reaction that melts the metal or that reduces and melts the metal, and generating gas during electrodeposition of the metal. Such processes generally produce large pore size distributions, are not compatible with the simultaneous formation of nanopores, are typically not very mechanically robust, and often have significant amounts of organic impurities. Other methods of making metal foams involve electrodeposition or metal condensation onto carbon skeletons. These approaches typically are not capable of generating small pore diameters and large bodies.

Other methods have been developed for producing porous metal oxide particles. Yue et al. ("Synthesis of Porous Single Crystals of Metal Oxides via a Solid-Liquid Route", *Chem. Mater.* 19:2359, 2007, and "Mesoporous metal oxides templated by FDU-12 using a new convenient method", *Studies Surf. Sci. Catal,* 170:1755, 2007), disclose that metal nitrates can be introduced into mesoporous silica particles by grinding the metal nitrate and mesoporous silica particles in a crucible and then heating the material at a rate of 1° C./min to 500° C. where the temperature is maintained for 5 hours. Yue et al. teach that the metal nitrate melted and entered the pores of the silica. They disclose images of small (<150 nm) sized particles. Yue et al.'s disclosure demonstrates a limitation of that method for preparing larger bodies. For example, the grinding step reduces the size of the mesoporous silica particles limiting the size of replica particle that can be produced. The grinding step would result in the destruction of a larger body. The heating ramp used also constitutes a limit on the size of replica that can be achieved as it provides insufficient time for transport of materials within the mesopores. As such, these methods have not been applied to larger porous bodies.

Moreover, while the decomposition of metal nitrates has been much studied, the results have been contradictory. As the temperature of a nitrate melt is raised towards the decomposition temperature of the nitrate, water of hydration can be lost producing compounds that may either be a liquid or a solid and so may or may not be able to move within a mesopore. The loss of water is determined by the pressure of any ambient atmosphere and by the rate of transport of the water vapor through the mesopores. This can be illustrated by considering the nickel nitrate system which is among the most studied metal nitrates. Heating nickel nitrate is reported to go through a series of dehydration steps (Brockner et al., "Thermal decomposition of nickel nitrate hexahydrate, $Ni(NO_3)_2 \cdot 6H_2O$, in comparison to $Co(NO_3)_2 \cdot 6H_2O$ and $Ca(NO_3)_2 \cdot 4H_2O$", *Thermochim. Acta* 456:64, 2007; Llewellyn et al., "Preparation of reactive nickel oxide by the controlled thermolysis of hexahydrated nickel nitrate", *Solid State Ionics* 101:1293, 1997; Mansour, "Spectroscopic and microscopic investigations of the thermal decomposition of nickel oxysalts. Part 2. Nickel nitrate hexahydrate", *Thermochim. Acta* 228:173, 1993; Paulik et al., "Investigation of the Phase Diagram for the System $Ni(NO_3)_2$—$H_2O$ and Examination of the Decomposition of $Ni(NO_3)_2$ $6H_2O$", *Thermochim. Acta* 121:137, 1987; and Estelle et al., "Comparative study of the morphology and surface properties of nickel oxide prepared from different precursors", *Solid State Ionics,* 156:233, 2003). Various mechanisms of decomposition of the nickel nitrate to nickel oxides are reported. (Brockner et al., *Thermochim. Acta* 456:64, 2007; Llewellyn et al., *Solid State Ionics* 101:1293, 1997; Sietsma et al., "Ordered Mesoporous Silica to Study the Preparation of $Ni/SiO_2$ ex Nitrate Catalysts: Impregnation, Drying, and Thermal Treatments", *Chem. Mater.* 20:2921, 2008; and Sietsma et al., "How nitric oxide affects the decomposition of supported nickel nitrate to arrive at highly dispersed catalysts", *J. Catal.* 260:227, 2008). Further, the products and the mechanism are both reported to depend upon the atmosphere under which the heating to decomposition takes place. Sun et al. ("Container Effect in Nanocasting Synthesis of Mesoporous Metal Oxides", *J. Am. Chem. Soc.* 133:14542, 2011) teach that even the shape of the container in which an amount of porous silica particles containing a metal nitrate melt is heated can change the structure of the metal oxide formed within the porous silica particles. Seitsma et al. (*Chem. Mater.* 20:2921, 2008 and *J. Catal.* 260:227, 2008) teach that carrying out heating of nickel nitrate under different atmospheres can affect the extent of migration of the nickel oxide product from the mesopores in silica particles onto the exterior of the particle. The affect of such variability in the decomposition and migration of metal nitrates has meant that these techniques have only been applied to particles, where the effects, though present, are more manageable and have less effect on the small scales seen with particle products. Such methods have not been applied for the preparation of larger porous materials.

Accordingly, there are no known methods for generating porous metal and/or metal oxide materials in which the spatial distribution of different metals and metal oxides within one material can be controlled. The methods disclosed herein can produce metal and/or metal oxide porous materials (e.g., bodies) having precisely controlled microstructure and nanostructure that includes control over the spatial distribution of a number of metal and metal oxides within the same material. The disclosed porous materials can be used in a variety of applications and can also incorporate carbon or silica present in some templates.

SUMMARY

In accordance with the purposes of the disclosed materials, compounds, compositions, articles, devices, and methods, as embodied and broadly described herein, the disclosed subject matter, in one aspect, relates to methods for producing metal and/or metal oxide porous materials. Metal and/or metal oxide porous materials, with or without a template, are also disclosed, as are methods of using the disclosed materials.

Additional advantages of the subject matter described herein will be set forth in part in the description that follows, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying Figures, which are incorporated in and constitute a part of this specification, illustrate several aspects of the invention and together with the description serve to explain the principles of the invention.

DETAILED DESCRIPTION

Figure 1:
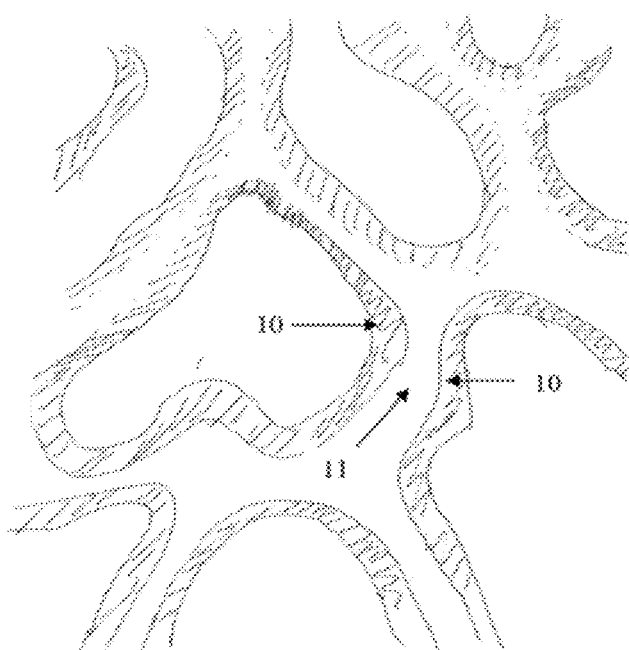
FIG. 1(a) is a cartoon of a porous material prepared by the methods disclosed herein. The porous material has a bimacroporous, "hollow" system in which two bicontinuous macroporous networks (10) are separated by a 100-500 nanometer thick membrane (11) (the membrane can also be referred to as a "wall" of the macropore). This membrane can be mesoporous and/or microporous or can be continuous (i.e., without porosity). The membrane can be metal, metal oxide, silica, carbon, or other material (e.g., sulfides). If the membrane is porous then the porous material has utility as "hollow fiber" membranes also known as contactors. If the membrane is not porous but is, for example, all metal, it can have utility as a heat exchanger, or if, for example, it comprises various metal oxides, which are oxygen permeable (generally as oxide) it can be used as an oxygen filter membrane.
FIG. 1(b) is an empirical, schematic representation of a bicontinuous structure.
Figure 1:
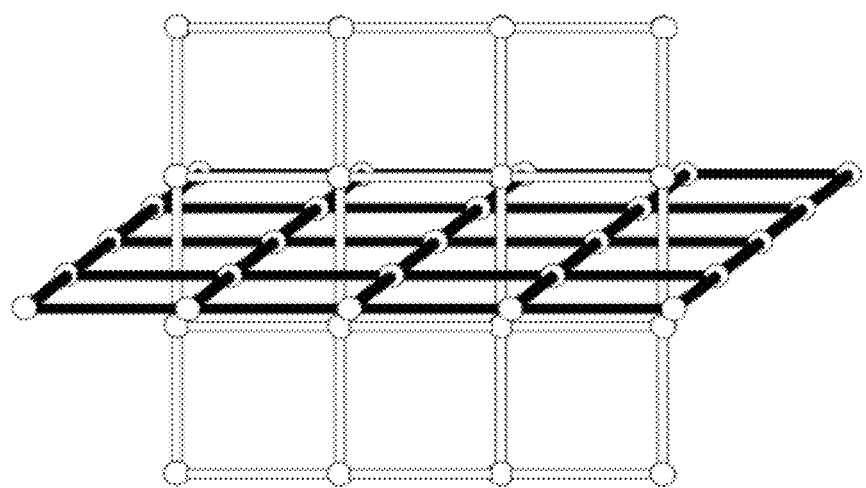

The materials, compounds, compositions, articles, devices, and methods described herein may be understood more readily by reference to the following detailed description of specific aspects of the disclosed subject matter and the Examples and Figures included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

GENERAL DEFINITIONS

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a metal salt" includes mixtures of two or more such metal salts, reference to "an agent" includes mixtures of two or more such agents, reference to "the porous material" includes mixtures of two or more such porous materials, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

By "continuous" is meant a phase such that all points within the phase are directly connected, so that for any two points within a continuous phase there exists a path which connects the two points and does not leave the phase. A "phase" in this context can refer to a pore, void, or a metal or metal oxide layer. A "bicontinuous" material contains two separate continuous phases such that each phase is continuous, and in which the two phases are interpenetrating as shown schematically in FIG. 1(b). It is impossible to separate the two structures without tearing one of the structures. Another example of a system with this property is the gyroid phase of block copolymers (Bates, "Block Copolymers—Designer Soft Materials", *Physics Today* February, 32, 1999, which is incororated by reference herein for its description of a bicontinuous material structure.)

By "tortuous" is meant when phases have only short straight line distances so that moving within the phase requires continuing changes in direction.

By "hollow" is meant when two continuous (void) network phases completely separated by a third continuous phase that prevents any direct contact between the two continuous void network phases. In a large body, material cannot travel from one continuous void phase to the other continuous void phase without passing through the third continuous separating phase.

By "hierarchical pores" and other forms of the phrase like "heirarchiacally porous material" is meant having pores that span a number of different length scales. As used herein materials with hierarchial pores have pores that span two or more length scales. Typically, there will be a distribution of pore diameters at each length scale, where often the distribution of pore diameters are sufficiently narrow that there is little or no overlap between the pore size distributions; there are some pore sizes for which few or no pores are present in such a hierarchically porous material.

By "constant diameter" is meant when the smallest distance across a continuous phase is constant, i.e., less than one standard deviation.

By the word "body" is meant a macroscopic, single piece of solid material typically with dimensions (length, width, and/or hight) exceeding about 1 mm. A body is distinguished from a particle, where the dimensions of the material are typically much less than that for a body.

By "partial infiltration" is meant that the metal salt or carbon precursor infiltrates and contacts less than all of the volume of the porous template. Generally, partial infiltration is when from about 10 to about 90, from about 25 to about 75, or about 50% of the template is filled with the metal salt or carbon precursor.

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of components A, B, and C are disclosed as well as a class of components D, E, and F and an example of a composition A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

Reference will now be made in detail to specific aspects of the disclosed materials, compounds, compositions, articles, and methods, examples of which are illustrated in the accompanying Examples and Figures.

Methods

The methods disclosed herein relate, in certain aspects, to the production of metal and/or metal oxide porous materials (e.g., bodies) by a single or repeated introduction of one or more metal salts into a porous template, and controlled thermal decomposition of the metal salt under reducing conditions or to convert the metal salt to metal. In another aspect, disclosed herein are methods for the production of metal and/or metal oxide porous materials by a single or repeated introduction of one or more metal salts into a porous template, and controlled heating of a metal nitrate under in an inert or oxidizing atmosphere, followed by thermal decomposition or reduction to convert the metal salt or metal oxide, respectively, to metal. These methods can also be used to produce metal and/or metal oxide nanowires. Generally, the disclosed methods comprise combining a composition comprising a metal salt (e.g., a neat metal salt, metal salt hydrate, metal salt solution, or melt) with a porous template to form a mixture; maintaining the mixture at below the decomposition temperature of the metal salt until a desired spatial distribution of the metal salt in the template is obtained; and then heating the mixture to above the decomposition temperature of the metal salt in the presence of a reducing agent or inert atmosphere to produce the metal and/or metal oxide porous material. These steps can optionally, be repeated with the same metal salt (e.g., a neat metal salt, metal salt hydrate, metal salt solution, or melt) or with a different metal salt. These steps can also, optionally, be followed by removal of the template.

Alternatively, disclosed herein is a method that comprises combining a composition comprising a metal nitrate (e.g., a neat metal nitrate, metal nitrate hydrate, or metal nitrate solution) with a porous template to form a mixture; maintaining the mixture at below the decomposition temperature of the metal nitrate until a desired spatial distribution of the metal nitrate in the template is obtained; and then heating the mixture to above the decomposition temperature of the metal nitrate in the presence of a reducing agent, inert atmosphere, or oxidizing atmosphere to produce the metal or metal oxide porous material. If the metal oxide is prepared the porous material the oxide can be reduced to prepare a metal porous material.

The disclosed methods involve the infiltration of metal salts as described herein into a suitable porous template to form a mixture. This occurs by contacting a composition comprising the metal salt with the porous template. The metal salt can be used in solution, hydrate or solvate form, or neat. When using a metal salt hydrate, solvate or neat salt, infiltration can be accomplished by contacting the porous template with the metal salt at above the salt's melt temperature, though below the salt's decomposition temperature. Alternatively, the metal salt can be part of a solution, i.e., the composition can comprise the metal salt and a solvent. For convenience, reference to the "metal salt" means either a neat metal salt, metal salt hydrate, metal salt solvate, or a metal salt solution, unless the context clearly refers to one or the other. Contacting the metal salt with the porous template can be performed by, for example, adding the porous template to the metal salt or by adding the metal salt solution to the porous template. Contacting can also be performed by slowly mixing one component with the other or by drop-wise addition of one component into the other. Agitation (e.g., stirring, shaking, or ultrasonic agitation) can be used to facilitate the contacting of the metal salt with the porous template.

The metal salts that are suitable for use in the disclosed methods can comprise one or more transition metals, alkaline metals, alkaline earth metals, or lanthanide metals. For example, a suitable metal salt can comprise a metal selected from the group consisting of of Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Sb, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Tl, Pb, and Bi. The counterion of the metal salt can be a nitrate, acetate, sulfate, or chloride. Other suitable counterions can be organic or inorganic ions such as carbonate, nitrile, bromide, iodide, phosphate, sulfite, phosphite, nitrite, and the like. Some particularly preferred metal salts are transition metal, alkaline metal, alkaline earth metal, or lanthanide metal nitrate, acetate, sulfate, or chloride. Metal salts suitable for use herein can be readily obtained from commercial suppliers or synthesized by methods known in the art. Similarly metal salt hydrates and metal salt solutions can be prepared by methods known in the art or obtained from commercial sources.

Metal salts for use herein have a decomposition temperature and a melting temperature. When using a composition comprising the metal salt hydrate, solvate, or neat metal salt the composition is heated above the melt temperature of the metal salt, but below the decomposition temperature of the metal salt. When using a composition comprising a metal salt and a solvent, the solvent can be any suitable solvent that dissolves the particular metal salt being used. In certain aspects, water is used as the solvent. Other aqueous solvents can be used, such as water/organic solvent mixtures. Suitable water/organic solvent mixtures contain water and an organic solvent that is at least partially miscible with water. For example, as aqueous alcohols, aqueous polyols, aqueous carboxylic acids, aqueous esters, aqueous aldehydes, aqueous ketones, and the like can be used. In other examples, carboxylic acids, alcohols, polyols, ketones, or aldehydes can be used and are advantageous solvents because they can also act as the reducing agent. The use of aqueous metal salt solutions is particularly advantageous as aqueous solutions effectively wet certain porous templates (e.g., silica templates), producing good penetration of the metal salt solution into the porous template. When a solution of a metal salt is used, the weight or molar ratio of metal salt to solvent can be from about 1:10 to about 10:1. For example, the weight ratio of metal salt to solution can be from about 1:10, 2:10, 3:10, 4:10, 5:10, 6:10, 7:10, 8:10, 9:10, 10:9, 10:8, 10:7, 10:6, 10:5, 10:4, 10:3, 10:2, 10:1, or 1:1. In other examples, the molar ratio of metal salt to solution can be from about 1:10, 2:10, 3:10, 4:10, 5:10, 6:10, 7:10, 8:10, 9:10, 10:9, 10:8, 10:7, 10:6, 10:5, 10:4, 10:3, 10:2, 10:1, or 1:1. A neat metal salt can be used as well, i.e., where there is no solvent. Further, metal salt hydrates and solvates can also be used. Such hydrates or solvates typically contain from 1 to 10 water or solvent molecules per metal center.

In a preferred aspect, a composition comprising an aqueous metal nitrate or metal nitrate hydrate is used. The use of the metal nitrate salts can be advantageous since such salts have high solubility in water. As metal nitrate hydrates, many metal nitrates also have a liquid range that allows for continued movement of the salt, improving the fidelity of the replication of the porous template, and increasing the surface area of the final product.

In preferred aspects, the composition comprising the metal salt is not a sol-gel or a metal foam.

The porous template can be a monolithic body. When the decomposition is under reducing conditions, the template can also be a particular template. The form and shape of the porous template used, as well as the amount and degree of infiltration of the metal salt into the porous template, affect the final form of the metal and/or metal oxide porous material. When using a monolithic form of porous template, the resulting metal and/or metal oxide porous material can be a bicontinuous monolithic body.

Suitable porous templates can be obtained commercially or can be prepared according to methods described in the art. For example, a number of groups have used colloidal crystal templating or self-assembly of polymer or silica beads to give a relatively hard template into which the metal salts disclosed herein can be infiltrated to create the disclosed metal and/or metal oxide porous material. See e.g., U.S. Pat. No. 6,911,192 and Nakanishi, "Pore Structure Control of Silica Gels Based on Phase Separation", *J. Porous. Mat.* 4:67, 1997. Infiltration of a sol-gel precursor including a surfactant as template can be used to induce ordered mesopores in the macropore walls of these materials (Li et al., "Controlling the Shape and Alignment of Mesopores by Confinement in Colloidal Crystals: Designer Pathways to Silica Monoliths with Hierarchical Porosity", *Langmuir* 23:3996, 2007). The major drawback of this approach is the expense of the polymeric beads for macroscopic pieces. A number of other methods of producing suitable porous templates have been developed using microemulsions (Carn et al., "Inorganic monoliths hierarchically textured via concentrated direct emulsion and micellar templates", *J. Mater. Chem.* 14:1370, 2004), bicontinuous polymer foams (Maekawa et al., "Meso/Macroporous Inorganic Oxide Monoliths from Polymer Foams", *Adv. Mat.* 15:591, 2003), salt crystals (Zhao et al., "Multiphase Assembly of Mesoporous-Macroporous Membranes", *Chem. Mater.* 11:1174, 1999), bacteria (Davis et al., "Baterial templating of ordered macrostructures in silica and silica-surfactant mesophases", *Nature,* 385:420, 1997), cellulose (Caruso et al., "Silica Films with Bimodal Pore Structure Prepared by Using Membranes as Templates and Amphiphiles as Porogens", *Adv. Functional Mater.* 12:307, 2002; Caruso et al., "Cellulose Acetate Templates for Porous Inorganic Network Fabrication", *Adv. Mat.,* 12:1921, 2000), sugars (Walsh et al., "Dextran templating for the synthesis of metallic and metal oxide sponges", *Nat. Mat.* 2:386, 2003), or ice (Nishihara et al., "Ordered Macroporous Silica by Ice Templating", *Chem. Mater.* 17:683, 2005) as templates for macrostructure, and foaming of the sol-gel silica (Suzuki et al., "Synthesis of mesoporous silica foams with hierarchical trimodal pore structures", *J. Mater. Chem.* 13:1812, 2003). Each of these articles is incorporated herein by reference for their teaching of processes for producing porous templates.

Suitable porous templates for use herein can comprise silica, carbon, metal, or metal oxide. In other examples, the porous template comprises a combination or composite of one or more of silica, carbon, metal, or metal oxide. In a preferred aspect, the porous template is a mesoporous and/or microporous silica. The use of a silica template is particularly advantageous since porous silica templates of controlled structure on the micrometer and nanometer scales are readily available.

A particularly suitable porous templates are hierarchically porous silica monoliths as prepared by the methods of Nakanishi et al. U.S. Pat. No. 6,911,192, and Smått et. al. (Smått, et al. "Versatile Double-Templating Synthesis Route to Silica Monoliths Possessing a Multimodal Hierarchical Porosity", *Chem. Mater.* 15:2354, 2003), which are incorporated by reference herein for their teaching of templates and their method of preparation and use.

When using a metal salt solution with the porous template, a portion of the solvent can be removed. This is done to concentrate the metal salt solution, thus forming a concentrated mixture of the metal salt solution and porous template. All of the solvent should not be removed, however, as enough solvent should remain in the concentrated mixture for maintaining the metal salt solution as a liquid.

The mixture of the composition comprising a metal salt and the porous template can be maintained at below the decomposition temperature of the metal salt (and in the case of a metal salt hydrate, solvate or neat salt above the melt temperature of the metal salt) for a sufficient period of time to allow the infiltration of the metal salt into the porous template to proceed to the desired degree of distribution. The melt temperature and the decomposition temperature of a metal salt is a value that can readily be determined based on the particular metal salt used. By controlling the temperature the degree of infiltration can be controlled. Rapid heating ramps should be avoided in that the metal salt can decompose prematurely, before it has infiltrated the template to the desired degree.

The pressure of the system can also be controlled, as well as the equilibration time, to control the degree of penetration of the metal salts into the porous template. Thus by controlling the pressure and time, one can only partially replicate the porous template or fully replicate the porous template, whichever is desired. Partial replication of the porous template can produce a second set of voids on a micrometer length scale.

The use of vacuum (e.g., from at or below about 1 Torr) to remove all air from the template and dissolved gases from the metal salt solution can produce an even spatial distribution of the metal salt and, consequently, metal and/or metal oxides in the porous template, because it prevents blockage of meso and micropores by air or dissolved gas. For example, the pressure can be at or below about 1 Torr, 0.1 Torr, $10^{-2}$ Torr, $10^{-3}$ Torr, $10^{-4}$ Torr, $10^{-5}$ Torr, or $10^{-6}$ Torr, where any of the stated values can form an upper or lower endpoint of a range. The use of reduced pressure therefore allows the metal salt to completely infiltrate the meso and/or micropores of the porous template. Increasing the time of contact and reducing the temperature during contact can also be used to achieve complete infiltration of the metal salt into the porous template.

When a vacuum is not applied at this step, or when pressure is increased, one can produce a metal and/or metal oxide porous material with a "hollow core" structure. A hollow core structure is when the mesoporous and/or microporous membrane of a porous template is only partially infiltrated by the metal salt. Thus, infiltration of the metal salt occurs into only surface mesopores. In other words, when walls of the macropores themselves contain mesopores and/or macropores, infiltration of the metal salt can be controlled with weaker vacuum or increased pressure so that the metal salt does not go completely through the meso and/or micropore. This results in spaces along the mesopores and/or micropores with no metal and/or metal oxide. Partial infiltration to produce a hollow core structure can also be achieved by shortening the time of contact between the metal salt and the porous template or by increasing the temperature during contact. Such partial replication of only a portion of the porous template can be used to produce useful and unique structures.

Once the desired spatial distribution of the metal salt in the porous template is attained, the mixture of the metal salt and porous template can then be heated to above the decomposition temperature of the metal salt under appropriate reducing conditions to convert the metal salt to a metal or metal oxide. Heating under reducing conditions can involve heating the mixture in the presence of a reducing agent. The reducing agent can be added to the mixture by any method known in the art or described herein. Suitable reducing agents can be hydrogen gas or alcohols, e.g., methanol, ethanol, and ethylene glycol, carboxylic acids (e.g., acetic acid), aldehydes, hydrazine, hydrides, ketones, boranes, and the like.

Decomposition should be carried out at the lowest temperature possible to prevent migration of the metal or metal oxide from nanometer sized pores into larger pores. Carrying out the decomposition under an atmosphere of hydrogen can convert the metal salt into metal. The presence of the hydrogen can assist in decreasing the mobility of the metal oxide and metal oxynitride intermediates produced in the reaction. This can improve the fidelity of the replication and increases the surface area of the final product. The use of reductants allows the decomposition of the metal salt to be carried out at lower temperature, improving the fidelity of replication and alleviating the use of hydrogen gas which in some cases can represent a safety concern. The resulting porous material can be cooled after the decomposition step under nitrogen, and then stored under nitrogen or degassed water or similar solvent. This can prevent reaction with oxygen to form the oxide.

The decomposition step can also be conducted under inert or oxidizing atmosphere. An inert atmosphere can be helium or argon. An oxidizing atmosphere can be synthesis gas or $CO_2$. This can produce a metal porous material or metal oxide porous material, respectively. Metal oxide porous materials can be reduced to metal porous materials by addition of a suitable reducing agent. The reducing agent can be added to the mixture by any method known in the art or described herein. Suitable reducing agents can be hydrogen gas or alcohols, e.g., methanol, ethanol, and ethylene glycol, carboxylic acids (e.g., acetic acid), aldehydes, hydrazine, hydrides, ketones, boranes, and the like.

The steps of the disclosed methods can optionally be repeated one or more times in order to control the nature of the microstructure and nanostructure of the porous material. This allows the production of mechanically robust metal and/or metal oxide porous materials with high surface area. The material can be kept under a chemically inert atmosphere or degassed solvent between steps or, alternatively, the material can be kept under air between steps.

In certain aspects, one or more of the steps disclosed herein can be performed under inert atmosphere, under air, at reduced pressure, at atmospheric pressure, or at about atmospheric pressure. Also, different metal salts can be used at each repetition cycle to produce different distributions of different metals and/or metal oxides in the final material. Also, when the desired degree of replication is achieved the template can optionally be removed.

As another additional and optional step, the disclosed methods can include adding an additional metal to the metal and/or metal oxide porous materials by electrodeposition, electroless deposition, or by displacement deposition.

The disclosed methods involving metal salt infiltration into a porous template, thermal decomposition of the metal salt under reducing condition, and removal of the template, can result in metal and/or metal oxide porous materials (e.g., porous particles or porous body). The disclosed methods can, with high fidelity, replicate the porous template's structure with metal and/or metal oxide. The resulting metal and/or metal oxide porous material is thus a high surface area metal and/or metal oxide composition.

Similar procedures to those disclosed herein for making metal and/or metal oxide porous materials can be used to produce porous carbon materials with similar structures and useful properties. There are a number of procedures known in the art for introducing carbon precursors into mesoporous silica templates and hierarchically porous silica templates (see e.g., Ryoo et al., "Ordered Mesoporous Carbons", *Adv. Mat.* 13:677, 2001, Lu et al., "Synthesis of Polyacrylonitrile-Based Ordered Mesoporous Carbon with Tunable Pore Structures", *Chem. Mater.* 16:100, 2004, Yang, et al. "Synthesis of replica mesostructures by the nanocasting strategy", *J. Mater. Chem.* 15:1217, 2005, and Hu et al., "Synthesis of Hierarchically Porous Carbon Monoliths with Highly Ordered Microstructure and Their Application in Rechargeable Lithium Batteries with High-Rate Capability", *Adv. Functional Mater.* 17:1873, 2007), which are incorporated herein for their teaching of carbon precursors, silica templates, and methods of using thereof. In general they involve infiltration of a carbon precursor such as a polymer precursor, where polymerization is thermally initiated. Subsequent pyrolysis under an inert atmosphere converts the polymer into carbon. The resultant replica can be produced in one infiltration cycle and has very significant microporosity. The electrical conductivity of the replica is dependent upon the temperature, with temperatures of 800-1000° C. being necessary to produce highly conducting carbon. These methods do not produce the hollow hierarchically porous structures as are disclosed herein. Such hierarchically porous carbon structures are produced by the methods disclosed herein and involve increasing the viscosity of the infiltrating carbon precursor solution, and by increasing the rate at which the polymerization of the carbon precursor occurs.

Disclosed herein is a method for producing a hollow, carbon porous material that comprises contacting a porous template, such as those disclosed herein, in particular a hierarchical porous template, and a polymerizable carbon precursor to form a mixture. This contacting step is performed such that the precursor does not infiltrate through the entire template and is referred to herein as partial infiltration. Then the mixture is heated to polymerize the precursor. Further heating is then performed to pyrolize the polymerized precursor, thereby producing a carbon porous material. These steps can be repeated with the same carbon precursor or with a different precursor. The disclosed process can be used to prepare hollow carbon porous materials.

In these methods, particular infiltration can be accomplished by varying the time of contact, rate of polymerization, and viscosity of the precursor. The carbon precursor can be of increased viscosity so that it does not penetrate as far or as quickly as a low viscosity precursor. Specifying the exact viscosity of the carbon precursor is not possible since the desirable viscosity will depend on the size and type of template, the type of carbon precursor (which affects the rate of polymerization), the time the precursor is contacted with the template, and the desired level of infiltration. More viscous precursors allowed to contact the template for a longer period of time can produce similar structures as a less viscous precursor allowed to contact the template for a shorter period of time. Thus, the practitioner can determine a sufficient viscosity for a given precursor by simple experimentation, raising or lowering the viscosity or time of contact with the template as needed to obtain the desired level of infiltration. If more viscous precursors are needed, additives such as sugars, alcohols, glycols, and alkanes can be added. Other suitable methods for increasing the viscosity include allowing the carbon precursor to undergo some polymerization prior to introduction to the hierarchically porous silica template.

Further, the rate of polymerization of the precursor can be varied to provide a desired level of infiltration. More rapid polymerization means that the polymerizable carbon precursor would not infiltrate as far as a slower polymerization rate. Suitable methods for increasing the rate of the polymerization of the precursor prior to introduction to the porous template include, but are not limited to addition of crosslinking agents or polymerization initiators.

The carbon precursor can be for example, furfuryl alcohol, poly(furfuryl alcohol), formaldehyde, resourcinol, phenol, 1,2,3-trihydroxybenzene, 1,5-dihydroxynaphthalene, polyvinyl chloride-acrylate terpolymer, phenol resin, acrylonitrile-methyl methacrylate copolymer, polyimide, polypyrrolone, polyaromatic resin, polydivinylbenzene, sucrose, or mixtures thereof. Further examples of suitable carbon precursors are disclosed in Lu et al. chapters 2 and 3, *Nanocasting: A Versatile Strategy for Creating Nanostructured Porous Materials*; Royal Society of Chemistry: Cambridge, 2010, which is incorporated by reference herein for its teachings of carbon precursors, templates and nanocasting techniques.

The use of silica templates, for the metal, metal oxide, or carbon based methods disclosed herein, allows for the use of well defined chemistry to remove the template. For example, the porous material can be immersed in concentrated aqueous hydroxide solution at from about 25° C. to about 110° C. For example, the material can be immersed for a period of about 4 to about 12 hours in 1-3 M aqueous sodium or potassium hydroxide solution. Alternatively, the material can be immersed in hydrofluoric acid. For metals such as copper and metal oxides such as zinc oxide, which are dissolved or corroded by exposure to aqueous hydroxide or hydrofluoric acid, the metal and/or metal oxide porous material can be immersed in a solution of basic alcohol such as a solution of sodium hydroxide or potassium hydroxide in dry methyl alcohol or ethyl alcohol in order to remove a silica template. In one example with copper, the corrosion of copper by aqueous potassium hydroxide solutions can be prevented by applying a small (0.3-3.0 Volt) anodic potential to the copper during the dissolution of the silica. However, the use of alcoholic base as described herein is more convenient and bypasses difficulties with contacting the copper.

Compositions

The metal and/or metal oxide porous materials produced according to the methods disclosed herein are porous. Similarly the carbon materials produced according to the methods disclosed herein are porous. The term "porous" as used herein means a material having a plurality of pores, holes, and/or channels, each of which may or may not extend throughout the entire length of the material. However, the pores can interconnect, resulting in a network of pores or voids that spans the material, permitting the flow of liquid or gas into and through the material, i.e., a continuous phase of pores or voids.

The disclosed materials can have two or more continuous phases, e.g., a bicontinuous structure. By "bicontinuous" is meant that both the voids/pores phase and the metal, metal oxide or carbon phase are continuous throughout the material. In other words, for a metal the metal surface is continuous and the materials can thus be electrically conductive. Similarly, the voids or pores are continuous so that a fluid (gas or liquid) can pass through the porous material. Bicontinuous can also refer to different porous networks, e.g., two or more continuous pore/void phases. This occurs when there are, for example, a macroporous network and a mesoporous network, both of which are continuous. Thus the disclosed materials can be bicontinuous by reference to the various pore or void phases that are continuous.

The disclosed materials can also be hollow in that two continuous void phases are completely separated by a third continuous phase that prevents any direct contact between the two continuous phases. To illustrate this characteristic, the disclosed materials can have a continuous phase made up of a non-porous oxygen conducting ceramic where air would enter through one continuous void network, the oxygen would pass through the ceramic and exit through the other continuous void network, and would leave behind the other components of air. A second illustrative example is when the third continuous, separating phase, was itself porous on a much smaller scale, such that only ions or molecules less than a given size could penetrate the third continuous separating phase. A solution containing a mixture of ions or molecules of various sizes could then enter through one continuous void phase, the selected ions or molecules could travel through the third separating geometry and exit through the second continuous void phase. Such geometries can therefore serve as filters.

When the disclosed materials have a hollow geometry they can be even-walled. By "even-walled" is meant where a third continuous phase separates two continuous void phases and the shortest distance between one continuous void phase and the other continuous void phase is constant. Equivalently, if the thickness of the third continuous separating phase is constant this material can be referred to as "even-walled". For filters and similar devices the property "even-walled" can be advantageous because it affects how fast material is transported across the third continuous phase, and it also impacts the pressure drop across this phase as material is transported through the phase. Materials with large variations in wall thickness, i.e., those which are not "even-walled," can have significant differences in the rate at which materials transport through the third continuous phase at different positions, this can lead to decreased selectivity in filter applications.

The disclosed materials can also be said to have hierarchical pores. As noted above, a material with hierarchical pores has pores that span two or more length scales. For example, the material can have both macropores and mesopores, both macropores and micropores, both mesopores and micropores, or macropores, mesopores and micropores.

Thus, in certain examples, the materials disclosed herein can have a macroporous system. This means the porous material has a plurality of pores, holes, and/or channels greater than about 0.1 µm in diameter, i.e., macropores. For example, the macropores can have a diameter of from about 0.5 µm to about 30 µm, from about 1 µm to about 20 µm, from about 5 µm to about 15 µm, from about 10 µm to about 30 µm, or from about 0.5 µm to about 15 µm in diameter.

The walls of the macropores (also termed the "membrane") can be from about 50 nm to about 15 µm, for example, from about 50 nm to about 600 nm, 100 nm to about 500 nm, from about 200 nm to about 400 nm, from about 50 to about 200, from about 300 to about 600 nm, from about 500 nm to about 5 µm, from about 5 µm to about 10 µm, or from about 5 µm to about 15 µm thick. In one aspect, the walls of the macropores are continuous, i.e., without porosity. In another aspect, the walls of the macropores are themselves porous. These pores, holes, and/or channels within the macropore walls can be from about 2 nm to about 30 nm, from about 10 nm to about 20 nm, from about 15 nm to about 50 nm, or from about 2 nm to about 15 nm in diameter, i.e., mesopores. Still further, the walls of the macropores can contain pores, holes, and/or channels that are less than about 2 nm, i.e., micropores. In a preferred aspect, the porous materials disclosed herein have macropores as well as meso and/or micropores, which exist in the membrane or macropore wall. This presence of pores of more than one length scale in one material is characterized as a hierarchical pore structure. In one aspect, the macropores lying within the membrane are themselves continuous. Such materials are hollow, hierarchically porous structures. In this aspect the macroporous phase lying within the membrane is completely separated from the macroporous phase lying outside the membrane. A cartoon showing a porous material as disclosed herein with both macropores and meso and/or micropores is shown in FIG. 1(a).

The structure of these hollow hierarchically porous bodies is such that the material is tortuous and contains three interpenetrating phases. All three phases are continuous. In certain aspects, two phases are voids and the third is solid and separates the two void phases such that any continuous path that joins any point in one void region to any point in the other void region must past through the third region. This geometry therefore functions as a filter or membrane.

Notably, this geometry is distinct from other porous materials and hierarchically porous materials. This is shown by comparing the disclosed materials to other types of porous materials:

Three dimensionally ordered materials (also known as 3-DOM, or colloid crystal templated materials) contain only two continuous phases, one solid the other void. Therefore, these structures are not hollow as that term is defined herein. These phases are tortuous and interpenetrating. But the absence of a third, continuous, separate void region means that these materials do not have the same features as the disclosed hollow hierarchically porous materials, which can be prepared by the methods disclosed herein. 3-DOM structures have distinctly different properties than the materials disclosed herein. The largest and smallest diameters of the void phase in 3-DOM materials are generally significantly different. As such, the disclosed materials can, in contrast to 3-DOM materials, have more than two continuous regions and narrow pore diameter distribution (e.g., less than 1 standard deviation in diameter).

Aerogels, ambigels, and xerogels are classes of materials prepared by sol-gel chemistry with removal of the solvent in different manners. The structure of these materials typically contains an agglomeration of small particles. The distribution of pore sizes is typically broad with pores as small as 2-5 nm to as large as 400-4000 nm. The materials have no order, and they may not be completely or even largely bicontinuous. These materials also do not have the property of being hollow. The materials disclosed herein are not aerogels, ambigels, and xerogels because, unlike those structures, they are bicontinuous, hollow and have a narrow distribution of pore sizes.

Foams are typically of two forms. In closed-cell foams the regions of one material are completely enclosed within a continuous region of a second material. While an open-cell foam can be bicontinuous, the void network is disordered and the diameters of the void network show a large range, with large spherical voids separated from each other by small windows. The materials disclosed herein are not foams.

The disclosed materials can, in certain examples, be described as tortuous, interpenetrating, and not hollow. Generally they have a smaller range of void network diameters than 3-DOM, foams, or aerogel materials, and have a narrower range of smallest dimensions across the solid material.

The disclosed porous materials can comprise one or more metals, metal oxides, or a combination thereof, wherein the metals are selected from the group consisting of Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Sb, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Tl, Pb, and Bi. When magnetic metals or metal oxides are present in the disclosed materials, the material can be magnetic.

The disclosed porous materials can have very high surface area, approaching that of nanoparticles. For example, the surface area can be greater than about 5, 10, 15, 20, 25, 30, 35, 40, 45, 50, 55, 60, 65, 70, 75, 80, 85, 90, 95, or 100 $m^2/g$, where any of the stated values can form an upper or lower endpoint of a range. In some examples, porous materials with a surface area up to about 200 $m^2/g$ are disclosed.

When the disclosed porous material is a carbon porous material the surface area can be even greater than that described for the metal and/or metal oxide porous materials. For example, in these materials the surface area can be greater than about 200, 400, 600, 800, 1000, 1200, or 1600 $m^2/g$, where any of the stated values can form an upper or lower endpoint of a range.

Further, the disclosed porous materials, in certain aspects, do not release nanoparticles of metal when used. This can be environmentally advantageous.

Additional components can be added to the disclosed metal and/or metal oxide porous materials, such as catalysts. The disclosed porous materials are not etch materials whereby ionizing radiation is used to form the pores. The disclosed materials can be substantially free (i.e., having less than about 1% by weight of the porous material) of surfactant. The disclosed materials can be substantially free (having less than about 1, 0.1, or 0.01% by weight of the porous material) of silica.

Also disclosed herein are compositions that comprise the metal and/or metal oxide porous materials disclosed herein and a carbon nanotube.

Applications

The disclosed methods allow the control of the spatial distribution of different metals and/or metal oxides simultaneously within the same porous material, and formation of metal and/or metal oxide nanowires. The metal and/or metal oxide porous materials produced by the methods disclosed herein can be used as packing materials in chromatography, as catalysts, or as electrocatalysts. The disclosed materials can be used for chemical conversions such as combustion of liquid and gaseous fuels, conversion of liquid and gaseous fuels to electricity, and conversion of electricity to liquid and gaseous fuels. The disclosed materials can be used to assist heat transfer or to store and release electrical charge. The disclosed materials can be used to convert light to electric energy.

In particular, any process that uses a metal or metal oxide catalyst can be adapted by using the metal or metal oxide porous materials disclosed herein. For example, nickel is used as a reduction catalyst. A porous material as disclosed herein comprising nickel can be likewise used as a reduction catalyst in similar processes. Similarly, the disclosed metal and/or metal oxide porous materials can be used as catalysts in other reactions where traditional metal and metal oxide catalysts are used, such as hydrogenation of carbon-carbon and carbon-heteroatom pi bonds (alkenes, alkynes, nitriles, imines, carbonyls, etc.), reduction of carbon-nitrogen or carbon-oxygen pi bonds to give alcohols and amines, Fischer-Tropsch type chemistry to make hydrocarbons from $CO/H_2$, hydrogenolysis of alcohols, hydrogen production from biomass, Pauson-Khand reactions (alkene+alkene+CO to give cyclopentanones), and dechlorination of aromatic compounds. Further, the disclosed porous materials would be advantageous over traditional heterogeneous catalysts given their high surface area, which would aid efficiency, and their monolithic structure, which would simplify separation of the catalyst and make continuous flow reactions an option.

In a preferred use, the disclosed materials can be used as starting materials for deposition of carbon nanotubes and other charge storage materials, and the like. The growth of carbon nanotubes on porous substrates is known. These processes can be adapted by using the metal and/or metal oxide porous materials disclosed herein as substrates for the carbon nanotubes. As such, disclosed herein are compositions that comprise the disclosed metal and/or metal porous materials and a carbon nanotube.

The disclosed materials can also be used in the production of metal and metal oxide nanowires for use in electrically and thermally conducting fabric, metal and metal oxide nanowires for use in catalysis and electrocatalysis, metal and metal oxide nanowires for use in information storage and the like. By controlling the level of infiltration of the metal salt into a porous template, thermal decomposition of the metal under reducing conditions or inert atmosphere, and removal of the porous template, a nanowire can be formed. The disclosed process also allows one to form large quantities of nanowires. As such disclosed herein are charge storage materials, nanowires, conducting fabric, catalysts, and information storage media comprising the porous materials disclosed herein.

Certain aspects of the disclosed methods can also be applied to the formation of porous carbon materials. The disclosed methods can also be applied to the production of microstructured and nanostructured porous carbon materials as templates for other materials, microstructured and nanostructured porous carbon bodies as catalyst support, microstructured, and nanostructured porous carbon bodies as current collectors in capacitors and batteries, microstructured and nanostructured porous carbon bodies as filters, microstructured and nanostructured porous carbon bodies as combined catalyst support and filter.

In a preferred use, the disclosed materials can be used as filters. There are many situations in which it is desirable to be able to separate or analyze an analyte or target molecule from a given sample or to remove impurities from a sample. For example, in disease diagnoses there is often a particular analyte that is produced by or part of a pathogen, and physicians use the presence or absence of that analyte to determine whether the patient is infected with the pathogen.

Described herein are methods for separating one or more target molecules present in a sample. "Separating a target from a sample" means removing the target molecule from the sample. In one aspect, the method involves passing the sample through a porous material as disclosed herein. When the sample is passed through the porous material, the target molecules can be localized on or in the porous material. The porous materials disclosed herein can permit the flow of liquid through or into the material. In certain embodiments, the target molecules are reversibly localized and in other embodiments the localization is irreversible.

Often it is desirable to detect the target molecules that have been localized, by for example, viewing them directly or assaying for some type of label that has been associated with the target molecule. Once the target molecule has been localized near the surface of the porous material, further processing steps may be performed. The target molecules can also be, for example, amplified, detected, or isolated. For example, the target molecules can also be counted, correlated, purified, or collected. One way of categorizing target molecule is by their size, relative to the pore size of the disclosed porous material used. For example, the target molecule can have a contour length or globular diameter at least 1.5 times, two times, three times, four times, six times, eight times, ten times, or twenty times the diameter of the pores in the porous material. Any target molecule that has the properties necessary for localization on the disclosed porous material can be targeted or manipulated. For example, the target molecule can be a protein, peptide, polypeptide (e.g., antibody, enzyme), carbohydrate, sugar, nucleic acid, phospholipid, detergent, or surfactant or a combination thereof.

Similarly, it is possible to use the disclosed porous materials as filters to remove impurities from a sample. This can be done by contacting a sample with impurities to the disclosed porous materials. The impurities can be trapped, adsorbed, and/or degraded by the porous material, thus resulting in the removal of the impurities from the sample. This method can be used to separate gaseous impurities from gaseous or liquid samples. It can also be used to separate liquid impurities from gaseous or liquid samples. For example, the disclosed porous materials can be used a solid state oxygen filters, and gas/liquid separators.

The disclosed porous materials can also be used in chromatography, for example, gas, HPLC, flash, or thin-layer chromatography, as the stationary phase. The chromatography can also involve the use of applied potential to control localization of target molecules, such as in electrochemical chromatography and electromodulated or electrochemically modulated chromatography. Because the disclosed porous materials have such high surface area and can be conductive, they are particularly well suited for these uses.

In another aspect, the disclosed porous materials can be used in fuel cells as a fuel cell separator. Thus, fuel cells comprising the disclosed porous materials are also contemplated herein.

In still another aspect, the disclosed porous materials can be used in environmental remediation. For example, the metal surface of the porous materials can be an active site to decompose hazardous materials. This can be useful for general remediation or waste water filtration. The material is also beneficial in that it can be retrofit into existing filtration systems and incorporated into existing industrial processes.

In still other examples, the disclosed porous materials have such high surface areas that they can be used for heat dissipation applications. For example, they can be used in heat exchanges, heat sinks (e.g., in computers and gaming consoles), thermal conduits, and the like. The disclosed porous material can be adapted to be positioned in a heat conducting relationship with an electronic module to be cooled. As another example, the disclosed porous materials can be used in cookware.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

The silica monoliths used in these examples were produced using the methods disclosed by U.S. Pat. No. 6,911,192, Nakanishi, "Pore Structure Control of Silica Gels Based on Phase Separation", *J. Porous. Mat.* 4:67, 1997 and Smätt, et al. "Versatile Double-Templating Synthesis Route to Silica Monoliths Possessing a Multimodal Hierarchical Porosity", *Chem. Mater.* 15:2354, 2003).

In a typical synthesis tetraethylorthosilicate (TCI America), 30% nitric acid, deionized water, polyethylene glycol MW=35,000 g/mol (Sigma-Aldrich), and OTAB (Alfa Aesar) were mixed in the following molar ratios, 1:0.25:14.7: 0.43:0.1, respectively. The solution was transferred into a template and allowed to gel for 72 hours at 40° C. Monoliths were then aged in 1 M ammonium hydroxide at 90° C. overnight followed by neutralization in 0.1 M nitric acid, rinsing three times with deionized water, three times with acetone, and dried at 40° C. for 72 hours. Finally, the silica monoliths were calcined at 550° C. for 5 hours with a ramp rate of 1° C./min.

Example 1

A concentrated solution comprising 77.7 g of $Co(NO_3)_2.6H_2O$ dissolved in 59.0 g of de-ionized water (4.5 mol/kg solvent) was prepared. Silica monoliths containing large pores, 1-5 μm in diameter, and much smaller pores, 4.5 nm in diameter, were dried under vacuum for 20 minutes and filled with the solution above. Monoliths became translucent and excess solution was removed from the outside. Filled monoliths were heated at 150° C. for 10 hours and then heated up to 400° C. over 4 hours and held at 400° C. for 30 hours while flowing 5% $H_2$ in $N_2$. The filling and heating steps were repeated 4 times. The silica was removed by soaking the composite in an aqueous potassium hydroxide solution (3 mol/liter water) overnight. This resulted in a free standing, porous cobalt metal monolith.

Figure 2:
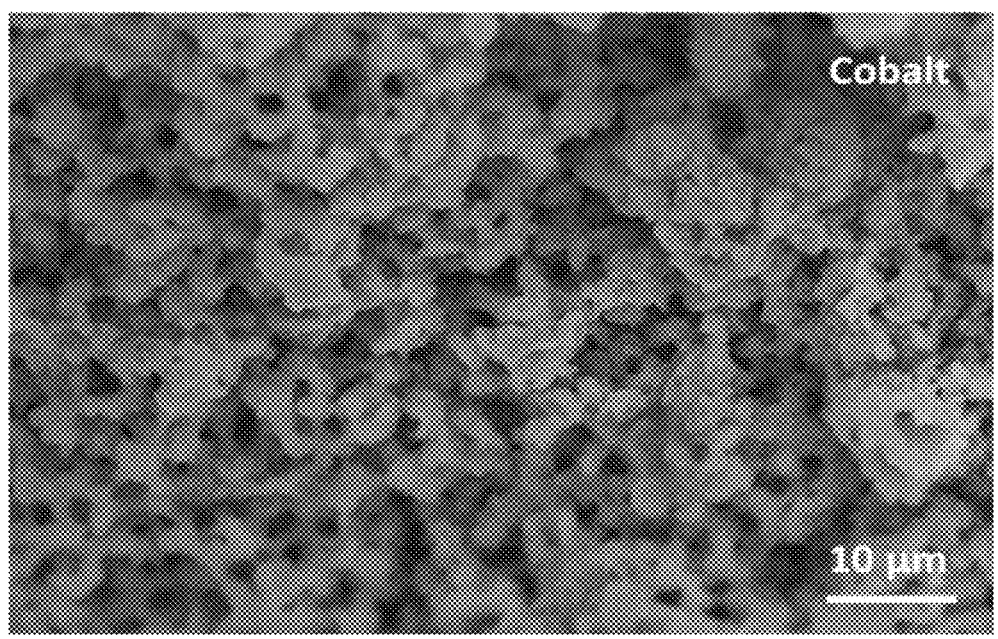
FIG. 2 is a SEM image of macropores in cobalt metal monolith.

Electron microscopy confirmed positive replication of the large pores and can be seen in FIG. 2. X-ray Diffraction confirmed the presence of cobalt metal. Replication of the small pores was confirmed by nitrogen adsorption measurements where the porosity, before removal of the silica, at 4.5 nm was nearly absent and after silica removal pores larger than 20 nm in diameter remain. The resulting specific surface area of this material was no less than 40 $m^2/g$.

Example 2

Figure 3:
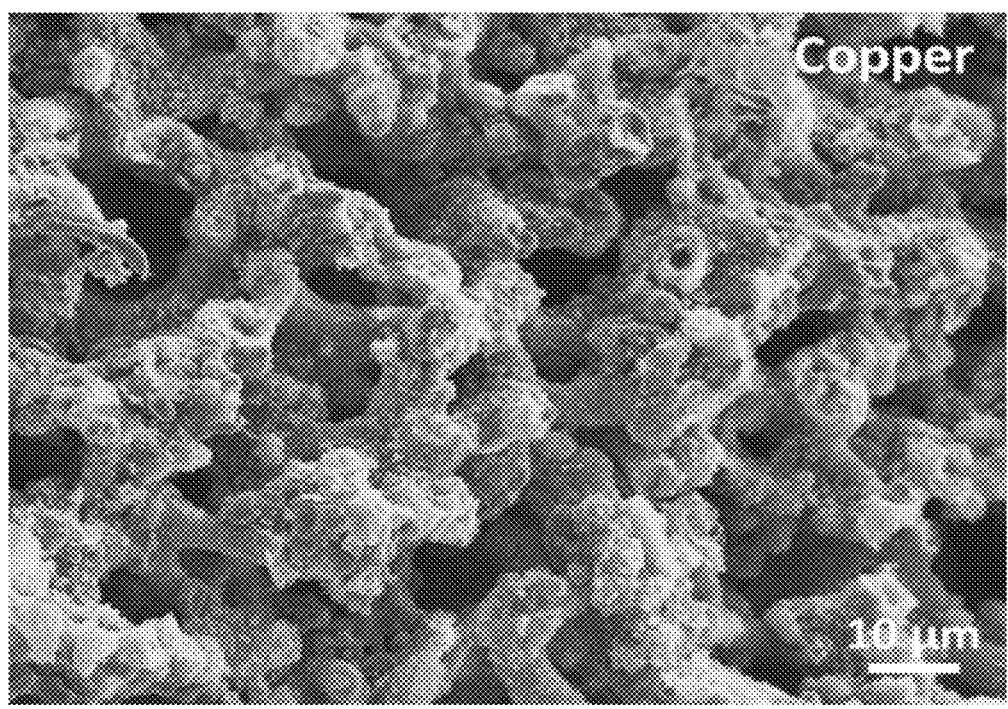
FIG. 3 is a SEM image of macropores in copper metal monolith.

In the same manner as Example 1, a concentrated solution consisting of 137.8 g of $Cu(NO_3)_2.3H_2O$ diluted to 100 mL with de-ionized water (5.7 mol/liter solution) was prepared and used to fill the pores of the silica monolith. Filled monoliths were dried under nitrogen atmosphere at 150° C. for 10 hours, and then heated up to 310° C. for an hour under a flow of nitrogen bubbled through methanol. The filling and heating cycles were repeated 3 times. The silica was removed by soaking the composite in a solution of potassium hydroxide (3 mol/liter) in dry methanol at 80° C. overnight. This resulted in a free standing, porous copper metal monolith. The same characterization methods were used as in Example 1. The resulting monolith gave a brilliant rose color and a SEM image can be seen in FIG. 3. The specific surface area of the resulting material was 10 m$^2$/g or greater.

Example 3

Figure 4:
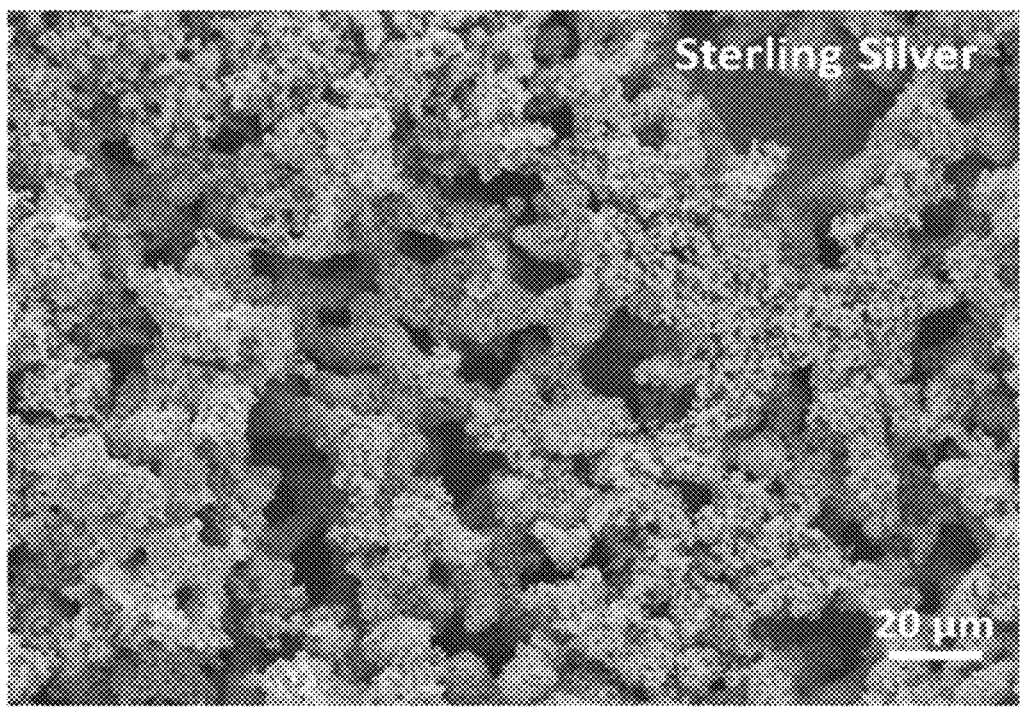
FIG. 4 is a SEM image of macropores in sterling silver monolith.

In the same manner as Example 1, a solution of 23.5 g AgNO$_3$, 2.7 g Cu(NO$_3$)$_2$.3H$_2$O, and 5 mL water was prepared and used to fill the pores of the silica monolith. Filled monoliths were dried at 150° C. for 10 hours, and then heated under an ethylene glycol atmosphere to reduce to the metal. The filling and heating cycle was done twice. The silica was removed by soaking the composite in an aqueous potassium hydroxide solution (3 mol/liter water) for several hours. This resulted in a free standing, porous sterling silver monolith and the SEM image can be seen in FIG. 4. The same characterization methods were used as in Example 1. The resulting specific surface area of this material was 2 m$^2$/g and greater.

Example 4

Figure 5:
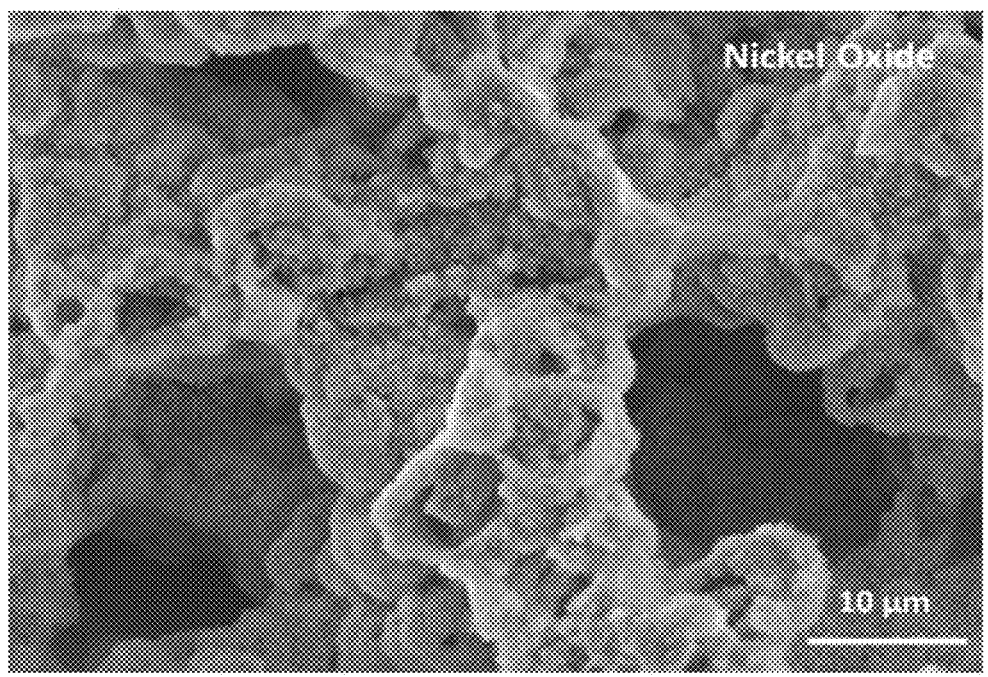
FIG. 5 is a SEM image of macropores in nickel oxide monolith.

In the same manner as Example 1, a concentrated solution of 59.6 g Ni(NO$_3$)$_2$.6H$_2$O diluted to 50 mL with de-ionized water was prepared and used to fill the silica pores. Filled monoliths are heated at 150° C. for 10 hours, and then at 250° C. for four hours to ensure complete decomposition. The filling and heating cycle was done three times. The monoliths were then heated to 600° C. for 5 hours. The silica was removed by soaking the composite in a solution of potassium hydroxide (3 mol/liter) in dry methanol at 90° C. overnight. This resulted in a free standing, porous nickel oxide monolith. The monoliths were grayish green in color and a SEM image can be seen in FIG. 5. The same characterization methods were used as in Example 1. The resulting specific surface area of this material was 32 m$^2$/g.

Example 5

A mixture of Co(NO$_3$)$_2$.6H$_2$O and water (16.5 M) was prepared. The mixture was then heated to 60° C., which is above the melting point of the salt, and kept there. Silica monoliths containing large pores, 1-5 μm in diameter, and much smaller pores, 4.5 nm in diameter, were placed in the solution and allowed to soak overnight, and were translucent in color the next day. They monoliths were then removed from the solution, placed in a 60° C. furnace so that the salt would not crystallize in the monoliths, and excess solution was removed. The monoliths were then heated for 10 hours at 150° C. for 10 hours under flow of 5% H$_2$ in N$_2$, and then at 400° C. for 24 hours under the same atmosphere. This process was repeated twice. The silica was removed in the same manner as Example 1. This resulted in a free standing, porous cobalt monolith.

Figure 6:
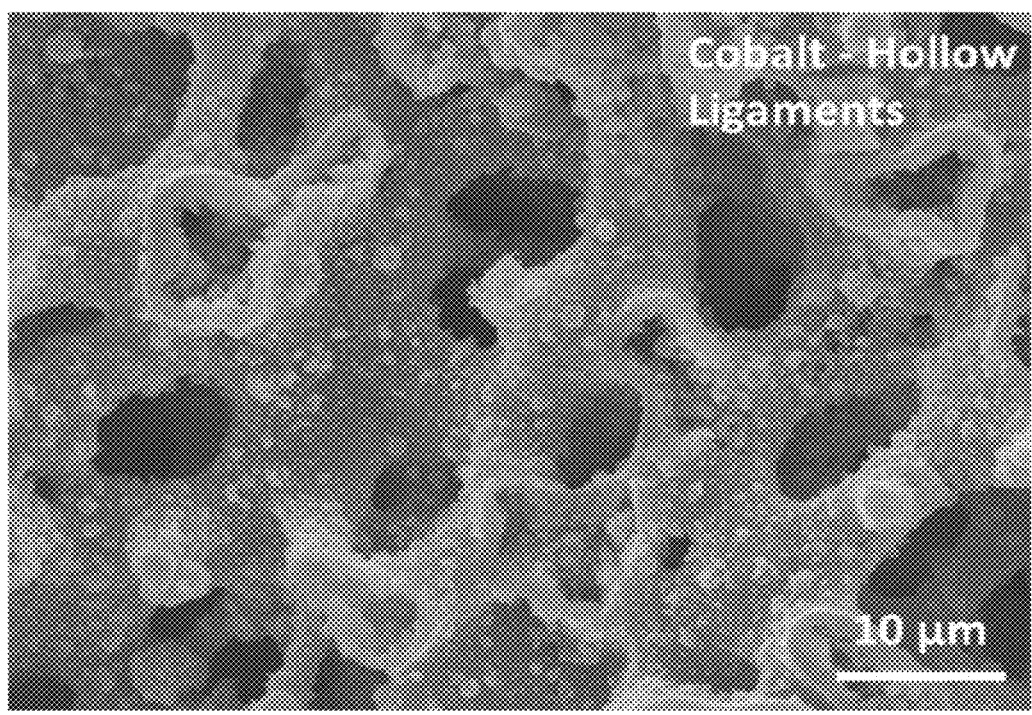
FIG. 6 is a SEM image of hollow fiber cobalt monolith with two separate macroporous networks.

Electron microscopy was used to confirm replication. These monoliths exhibited the same positive replica of the large pores, but also contained hollow ligaments within the walls, as seen in FIG. 6. This gave a specific surface area of 65 m$^2$/g.

Example 6

Figure 7:
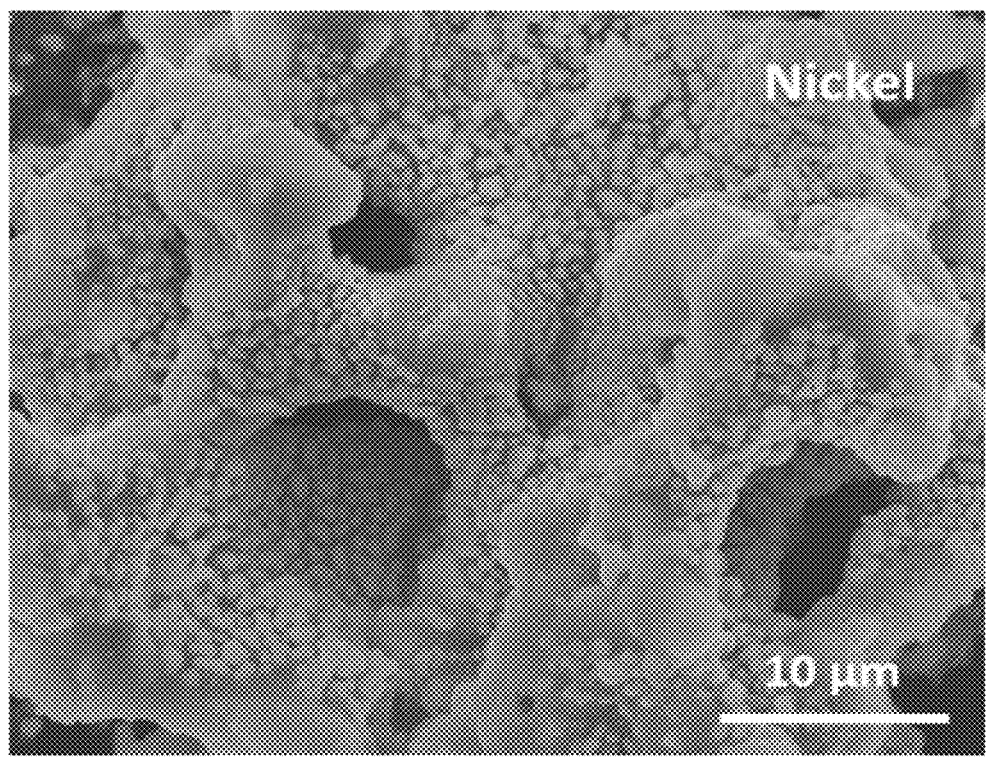
FIG. 7 is a SEM image of macropores in nickel metal monolith.

The solution from Example 4 was used and introduced into the silica as in Example 1. The filled monolith was heated at 150° C. for 10 hours under flow of 5% H$_2$ in N$_2$, and then at 350° C. for 10 hours under the same atmosphere. This process was repeated 4 times. However, great care was taken not to expose the samples to oxygen. They were kept under deoxygenated water or nitrogen gas the entire time. The silica was removed in deoxygenated potassium hydroxide solution (3 mol/L). The same characterization methods were used as in Example 1 and a SEM image of the nickel replica can be seen in FIG. 7. The specific surface area of this nickel metal replica was 15 m$^2$/g or better.

Example 7

Figure 8:
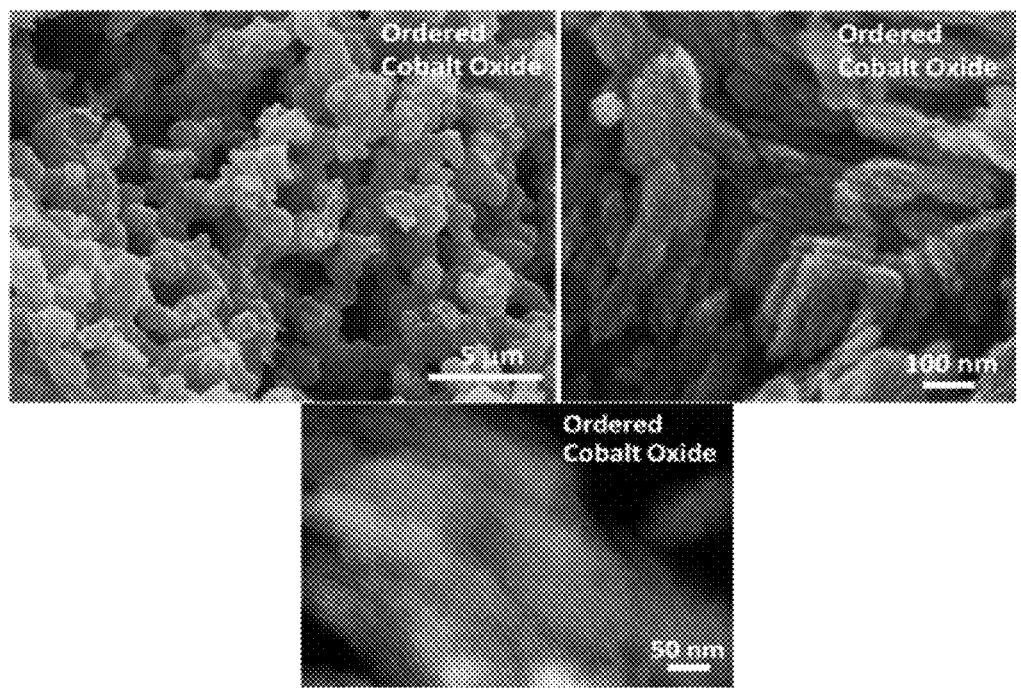
FIG. 8 is a group of SEM and TEM images of cobalt oxide monolith macropores (5 micrometer scale bar image) and highly ordered mesopores (100 and 10 nm scale bar images).

The solution from Example 1 was used and introduced into the silica as in Example 1. The silica monoliths contained large pores, 1-5 μm in diameter, and much smaller pores, about 8 nm in diameter, that are ordered in orientation. The filled monoliths were heated at 150° C. for 10 hours under N$_2$ flow and then at 250° C. for 1 hour under the same atmosphere. This process was repeated twice. The silica was removed in the same manner as in Example 1. This resulted in a free standing, porous cobalt oxide monolith containing ordered pores of about 4 nm. The same characterization methods were used as in Example 1 and electron microscope images of the ordered cobalt oxide replica can be seen in FIG. 8. The specific surface area of this cobalt oxide replica was 120 m$^2$/g or better.

As described, according to the disclosed methods it is possible to produce porous bodies composed of metals and metal oxides and mixtures of various metals and metal oxides that have structure at a number of length scales, where the structure is determined by the template used and the precise procedure carried out. Applications of such materials include, but are not limited to chromatography and other separations methods, catalysis and electrocatalysis, energy storage and energy conversion.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible aspects may be made of the invention without departing from the scope thereof, it is to be understood that all matter herein set forth is to be interpreted as illustrative and not in a limiting sense.

What is claimed is:

1. A method for producing a metal and/or metal oxide hierarchically porous body, comprising:
 (i) contacting a monolithic hierarchically porous template and a neat metal salt or metal salt hydrate to form a mixture, wherein the neat metal salt or metal salt hydrate has a decomposition temperature and a melting temperature, and wherein the neat metal salt or metal salt hydrate is heated to a temperature above the melting temperature of the neat metal salt or metal salt hydrate, but below the decomposition temperature of the neat metal salt or metal salt hydrate;
 (ii) maintaining the mixture at a temperature above the melting temperature of the neat metal salt or metal salt hydrate, but below the decomposition temperature of the neat metal salt or metal salt hydrate until a desired spatial distribution of the neat metal salt or metal salt hydrate in the monolithic hierarchically porous template is obtained; and then
 (iii) heating the mixture to above the decomposition temperature of the neat metal salt or metal salt hydrate in the presence of a reducing agent or inert atmosphere to produce the metal and/or metal oxide hierarchically porous material; and optionally repeating steps (i)-(iii) with the same neat metal salt or metal salt hydrate or with a different neat metal salt or metal salt hydrate.

2. The method of claim 1, wherein the neat metal salt or metal salt hydrate comprises a metal selected from the group consisting of Li, Be, Na, Mg, Al, K, Ca, Sc, Ti, V, Cr, Fe, Cu, Ga, Rb, Sr, Y, Zr, Nb, Mo, Tc, Ru, Rh, Pd, Cd, In, Sb, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Tl, Pb, and Bi.

3. The method of claim 1, wherein the neat metal salt or metal salt hydrate comprises a metal selected from the group consisting of Ni, Co, Mn, Ag, Zn, and Sn.

4. The method of claim 1, wherein the monolithic hierarchically porous template is contacted with a neat metal salt.

5. The method of claim 1, wherein the monolithic hierarchically porous template is contacted with a metal nitrate hydrate or a neat metal nitrate.

6. The method of claim 1, wherein the monolithic hierarchically porous template comprises a composite of one or more of silica, carbon, metal, or metal oxide.

7. The method of claim 1, wherein the monolithic hierarchically porous template comprises silica.

8. The method of claim 1, wherein the monolithic hierarchically porous template comprises macropores having a diameter of from greater than about 0.1 µm in diameter and mesopores having a diameter of from about 2 nm to about 30 nm.

9. The method of claim 1, wherein the reducing agent comprises hydrogen gas, alcohol, polyol, carboxylic acid, aldehyde, hydrazine, hydride, ketone, or borane.

10. The method of claim 1, further comprising removing the monolithic hierarchically porous template.

11. The method of claim 10, wherein the monolithic hierarchically porous template comprises silica and the silica is removed by immersing the hierarchically porous material from step (iii) in an aqueous hydroxide solution at from about 25° C. to about 110° C.

12. The method of claim 10, wherein the monolithic hierarchically porous template comprises silica and the silica is removed by immersing the hierarchically porous material from step (iii) in hydrofluoric acid.

13. The method of claim 10, wherein the monolithic hierarchically porous template comprises silica and the silica is removed by immersing the hierarchically porous material from step (iii) in a solution of basic alcohol.

14. The method of claim 1, further comprising adding an additional metal to the metal and/or metal oxide hierarchically porous material by electrodeposition, by electroless deposition, or by displacement deposition.

15. The method of claim 1, wherein the monolithic hierarchically porous template is contacted with a metal salt hydrate.

* * * * *